Aug. 2, 1927.
H. E. ALTGELT
1,637,925
CULTIVATOR
Filed Feb. 19, 1924
3 Sheets-Sheet 3
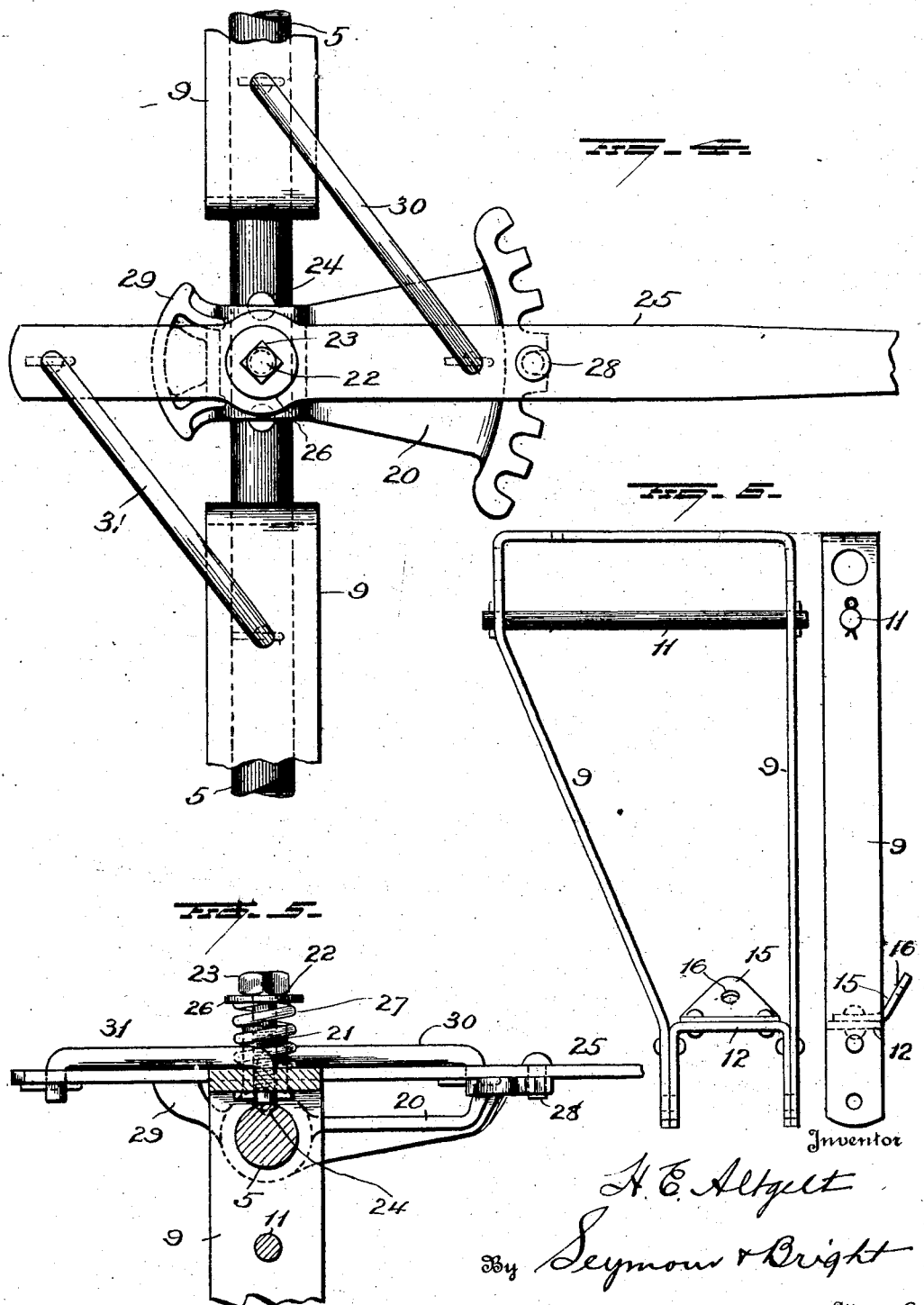

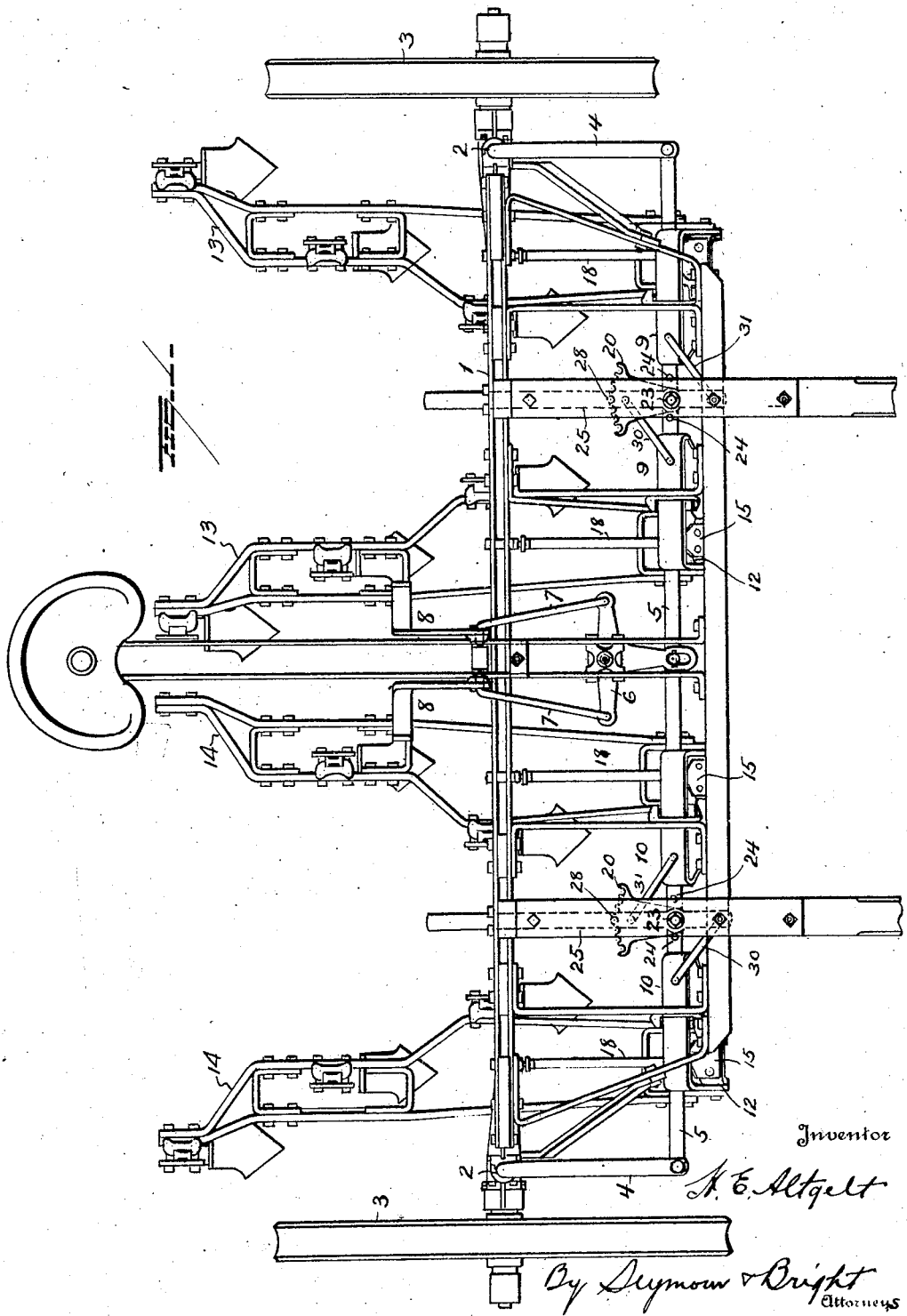

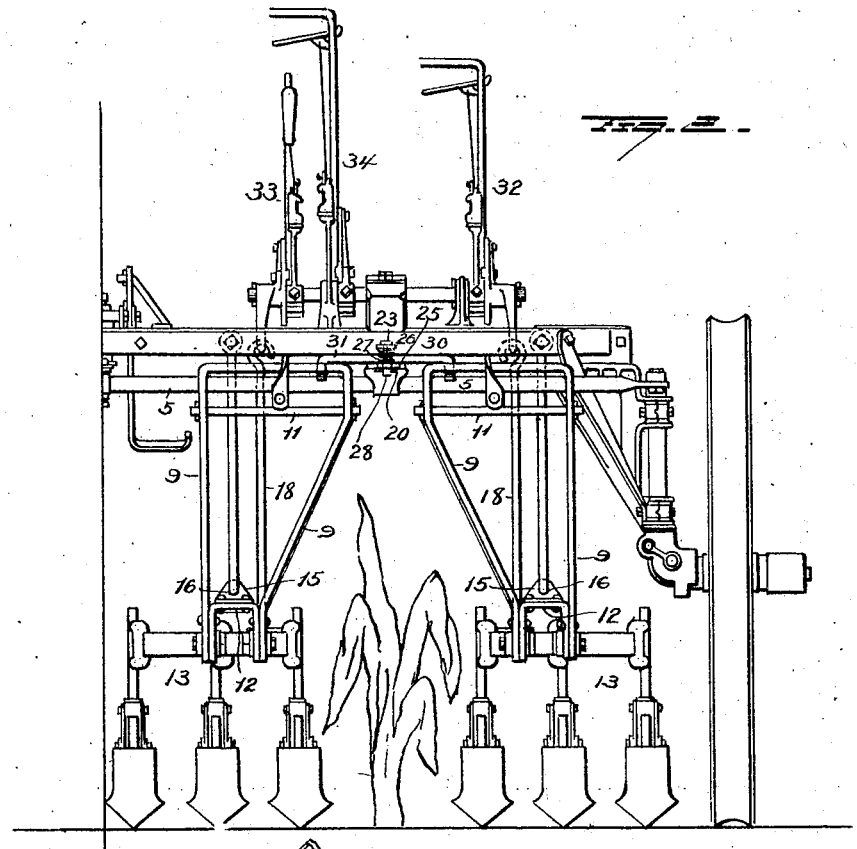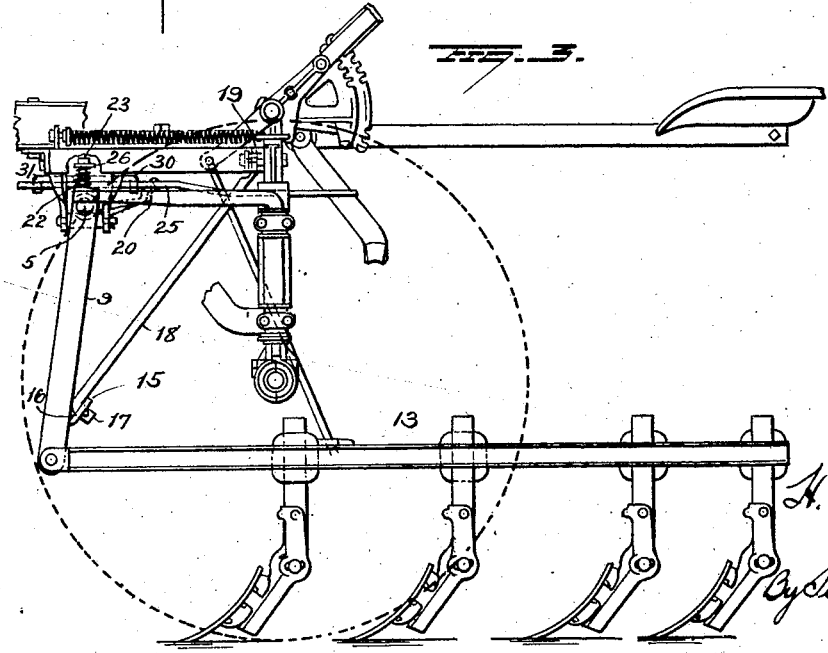

Patented Aug. 2, 1927.

1,637,925

UNITED STATES PATENT OFFICE.

HERMAN E. ALTGELT, OF SOUTH BEND, INDIANA, ASSIGNOR TO OLIVER CHILLED PLOW WORKS, OF SOUTH BEND, INDIANA.

CULTIVATOR.

Application filed February 19, 1924. Serial No. 693,891.

This invention relates to improvements in cultivators and has particular reference to cultivators of the two-row type.

When the plants are small, it has been the custom to run the cultivator shovels close to them, but when they have become a little larger, it is desirable to spread the cultivator shovels farther away from the plants in order not to injure their roots. It sometimes happens that in one row, the plants will be much larger than in the row next to it. It is then advisable to run the pair of cultivator gangs which is working over the larger plants spread apart, and the gangs which are working over the smaller plants comparatively close together.

One object of my invention is to provide simple and efficient means whereby the gangs of the respective pairs of gangs may be independently adjusted so that the gangs of one pair may be caused to run comparatively close to young or small plants and the gangs of the other pair caused to run sufficiently spaced from older or larger plants in another row to avoid possibility of injuring the roots of such older or larger plants.

A further object is to provide lever means whereby the gangs of each pair may be quickly and accurately adjusted to suit the condition which may be met in the field and to so construct the lever mechanisms that the same may be adjusted bodily in such manner as to space the respective pairs of gangs in accordance with the space between rows of plants.

With these and other objects in view, the invention consists in certain novel features of construction and combinations of parts as hereinafter set forth and pointed out in the claims.

In the accompanying drawings,—

Figure 1 is a plan view of a cultivator showing an embodiment of my invention.

Figure 2 is a front view.

Figure 3 is a side elevation, and

Figures 4, 5 and 6 are views illustrating certain details of construction.

The frame of the cultivator is represented at 1 and at respective ends of said frame pivot axles 2 are mounted and provided with suitable spindle portions which enter the hubs of carrying wheels 3. The respective pivot axles are provided with forwardly projecting arms 4 and these are connected by a transverse rod or connecting shaft 5. A three-armed lever 6 is pivotally supported at the juncture of its arms by the frame 1 (at the central portion thereof) and one of these arms has loose connection with the rod or shaft 5 and the other two arms are connected by rod 7 with foot levers 8 for steering purposes.

The upper portions of two pairs of hangers 9—9 and 10—10 are slidingly mounted on the cross rod or shaft 5 and each of said hangers may be braced at its upper portion by a cross bar 11 which will prevent spreading of such upper portion of the hanger. Each hanger is so formed that its lower portion will be reduced in width and provided with a yoke or stirrup 12 (forming part of the hanger structure) for connection with the forward portion of one of the cultivator gangs 13—13 and 14—14. A cultivator gang being connected with each hanger and there being four hangers (two pairs), two pairs of cultivator gangs are employed. A lug 15 is secured to the stirrup portion 12 at the lower end of each hanger and projects upwardly and rearwardly therefrom,—each lug being provided with a hole 16 which receives a short arm 17 at the lower end of a diagonal brace rod 18, the upper end of each rod 18 being pivotally connected at 19 with the frame 1. The rods or braces 18 serve to prevent forward or backward movements of the hangers but permit said hangers to be moved laterally on the rod or shaft 5 when the gangs are being adjusted laterally.

Mounted upon the rod or shaft 5 between the center and respective ends thereof are sector-brackets 20, each of which is provided with an upwardly projecting sleeve or boss 21 which is internally threaded for the accommodation of a screw bolt 22,—the latter having a head 23 at its upper end and the lower end of each screw bolt 22 is adapted to enter any one of a series of sockets or depressions 24 in the rod or shaft 5 for a purpose hereinafter explained. Each screw bolt 22 constitutes the pivot axis of a lever 25 and between the lever and a disk 26 under the head 23 of the screw bolt, a spring 27 is located and serves normally to press said lever downwardly on the sector-bracket and cause a pin or projection 28 carried by said lever to enter one or another of the notches of the sector-bracket and thus hold the lever in the position to which it may be adjusted. The sector-bracket is provided with an arm 29 to afford a stop or support for the lever forwardly of the pivot mounting of said lever and the rod or shaft 5. Each lever 25 is connected by a rod or link 30 with one of the adjacent hangers and by a rod or link 31 with the other adjacent hanger,—the forward end of the rod or link 30 being connected with the lever forwardly of its pivot mounting and the rear end of the rod or link 31 being connected with said lever rearwardly of its pivot mounting. It is apparent that when one of the levers 25 is moved horizontally, the two hangers connected therewith and the cultivator gangs connected with said hangers will be moved either away from each other so as to spread the cultivator gangs or toward each other so as to cause the cultivator gangs to run more closely to the plants, according to the direction in which the lever may be shifted. In order to shift either of the levers horizontally for the purpose above explained, the operator will first raise the lever against the resistance of the spring 27 in order to release the pin or projection 28 from the notched sector and he will then shift the lever horizontally to the desired extent and release it,—whereupon the spring 27 will operate to restore the lever to its normal horizontal position with the pin or projection 28 in locked engagement with the sector and thus the cultivator gangs will be locked in the positions to which they may have been adjusted.

By unscrewing the screw bolts 22 so as to move their lower ends out of the notches or recesses 24 in which they had engaged, the sector-bracket and levers may be shifted bodily in one direction or another for the purpose of adjusting the spacing of the pairs of cultivator gangs relatively to each other to accommodate the spacing of the rows of plants. When the sector-bracket shall have been adjusted, the screw bolts 22 will be caused to engage other notches or recesses 24 in the rod or shaft 5 and thus hold the pairs of cultivator gangs in their adjusted positions.

With my improvements the cultivator gangs of each pair may be adjusted independently so that the gangs of one pair may be caused to run more or less closely to young plants in one row, while the cultivator gangs of the other pair may be separately adjusted so as to spread the gangs of this pair and cause them to run sufficiently spaced from larger plants in an adjacent row to avoid possibility of injury to the roots of such larger plants. Each of the mechanisms for accomplishing the adjustments of the gangs of each pair may be shifted in a manner to space the pairs of gangs relatively to each other according to the distance apart of the rows of plants.

In the structure shown in the drawings, provision is made for raising and lowering the cultivator gangs. The devices for this purpose may comprise levers 32—33 for raising the separate gangs and a lever 34 for raising a pair of gangs,—such lever mechanism being provided for each pair of gangs, but as these devices constitute no part of my present invention, a description of the specific construction and arrangement of parts is unnecessary herein.

Having fully described my invention what I claim as new and desire to secure by Letters-Patent, is:

1. In a cultivator, the combination of a plurality of pairs of cultivator gangs, independent lever means connected with each pair of gangs and operable independently to adjust the gangs of the respective pairs laterally with relation to each other, and means whereby each lever means may be adjusted laterally to adjust the spacing of pairs of gangs relatively to each other.

2. In a cultivator, the combination with a frame, a transverse shaft, a pair of cultivator gangs, and hangers movably mounted on said shaft and connected respectively with the respective cultivator gangs of the pair, of a sector-bracket mounted on said shaft between the hangers, an operating lever pivoted intermediate of its ends over said sector-bracket and having a part cooperable with the sector-bracket to lock said lever at different adjustments, spring means pressing against said lever for normally holding it in locked relation to the sector-bracket, and rods connected to said lever at respective sides of the pivot axis of the latter, said rods being connected respectively with the respective hangers.

3. In a cultivator, the combination with a frame, a transverse shaft, a pair of cultivator gangs, and a pair of hangers mounted to move on said shaft and connected with the respective cultivator gangs, of a sector-bracket having a notched portion, a lever pivotally mounted between its ends over said sector-bracket and capable of vertical movement, a part projecting from said lever to enter one or another of the notches of the sector-bracket, spring means normally holding said lever in position with said part engaging in a notch of the sector-bracket, said sector-bracket having a forwardly projecting part constituting a support under the forward arm of said lever, and rods connected with said lever at respective sides of its pivot axis, said rods being also connected respectively with the respective hangers.

4. In a cultivator, the combination with a frame, a transverse shaft, a pair of cultivator gangs, and hangers movably mounted on said shaft and connected respectively with the respective cultivator gangs, of a sector-bracket mounted on said shaft, an operating lever mounted over said sector-bracket and cooperable therewith, rods connected with said lever at respective sides of its pivot axis, said rods being connected respectively with the respective hangers, and means whereby said sector-bracket and parts connected therewith may be adjusted laterally on said shaft to adjust a pair of gangs laterally.

5. In a cultivator, the combination with a frame, a transverse shaft, a pair of cultivator gangs, and hangers movable on said shaft and connected respectively with the respective cultivator gangs of the pair, of a sector-bracket supported by said shaft between said hangers, a lever pivoted between its ends over said sector-bracket and cooperable with the latter to lock said lever at different adjustments, an internally threaded part on said sector-bracket, a screw bolt passing through said internally threaded part and adapted to engage said shaft to hold the sector-bracket thereto, a spring between said lever and one end of said bolt, and rods connected with said lever at respective sides of its pivot axis, said rods being connected respectively with the respective hangers.

In testimony whereof, I have signed this specification.

HERMAN E. ALTGELT.